United States Patent [19]
Obry et al.

[11] Patent Number: 5,860,624
[45] Date of Patent: Jan. 19, 1999

[54] TILTING ADAPTOR FOR THE CARRIAGE OF SEVERAL PAYLOADS ON THE SAME LAUNCHER

[75] Inventors: Daniel Obry, Rosny sur Seine; Raymond Pimont, Mezieres; Guy Chevalier, Les Mureaux, all of France

[73] Assignee: Aerospatiale Societe Nationale Industrielle, Paris Cedex, France

[21] Appl. No.: 776,590

[22] PCT Filed: Jun. 5, 1996

[86] PCT No.: PCT/FR96/00847

§ 371 Date: Feb. 6, 1997

§ 102(e) Date: Feb. 6, 1997

[87] PCT Pub. No.: WO96/39328

PCT Pub. Date: Dec. 12, 1996

[30] Foreign Application Priority Data

Jun. 6, 1995 [FR] France .................................. 95 06642

[51] Int. Cl.[6] .......................................................... B64G 1/64
[52] U.S. Cl. ........................................ 244/158 R; 244/161
[58] Field of Search .................................... 244/2, 158 R, 244/161, 63

[56] References Cited

U.S. PATENT DOCUMENTS

| | | |
|---|---|---|
| 3,380,687 | 4/1968 | Wrench et al. ..................... 244/158 R |
| 3,420,470 | 1/1969 | Meyer .................................. 244/158 R |
| 3,547,375 | 12/1970 | Mackey . |
| 3,903,803 | 9/1975 | Losey . |
| 3,907,225 | 9/1975 | Welther ............................... 244/158 R |
| 4,632,339 | 12/1986 | Yuan .................................... 244/158 R |
| 4,679,752 | 7/1987 | Wittmann et al. . |
| 4,776,539 | 10/1988 | Byers et al. ........................ 244/158 R |
| 4,860,974 | 8/1989 | Barnett et al. ...................... 244/158 R |
| 5,040,748 | 8/1991 | Torre et al. ......................... 244/158 R |
| 5,199,672 | 4/1993 | King et al. .......................... 244/158 R |
| 5,411,226 | 5/1995 | Jones et al. ......................... 244/158 R |
| 5,529,264 | 6/1996 | Bedegrew et al. ............. 244/158 R X |
| 5,743,492 | 4/1998 | Chan et al. ..................... 244/158 R X |

FOREIGN PATENT DOCUMENTS

| | | |
|---|---|---|
| 0 381 869 | 2/1990 | European Pat. Off. . |
| 42 43 562 | 12/1992 | Germany . |

*Primary Examiner*—Charles T. Jordan
*Assistant Examiner*—Charles R. Ducker, Jr.
*Attorney, Agent, or Firm*—Oblon, Spivak, McClelland, Maier & Neustadt, P.C.

[57] ABSTRACT

In order to be able to install in juxtaposed manner several satellites beneath the nose cone of the same launcher without any collision risk at the time of their separation, between each satellite and the support plate is positioned an adaptor. During launch, the adaptors occupy a size-limiting carriage position. When it is wished to control the separation of a satellite, its adaptor passes into a separation position, in which the satellite is tilted or swung away from the neighbouring satellite or satellites.

7 Claims, 5 Drawing Sheets

TILTING ADAPTOR FOR THE CARRIAGE OF SEVERAL PAYLOADS ON THE SAME LAUNCHER

DESCRIPTION

1. Technical Field

The invention relates to an adaptor designed for installation on a launcher carrying structure when the launcher is intended to simultaneously carry in juxtaposed manner at least two payloads, such as satellites.

Such an adaptor can be used on any type of launcher, when it is wished to simultaneously carry several heavy satellites in juxtaposed manner beneath the nose cone of the same launcher.

2. Prior Art

In order to reduce satellite launching costs, ever more frequently consideration is given, when their size permits, to simultaneously carrying several satellites on the same launcher.

Means making it possible to simultaneously carry several satellites on the same launcher and then separate the satellites therefrom are already operational. For example, U.S. Pat. No. 3,380,687 and U.S. Pat. No. 5,199,672 illustrate means for placing beneath the nose cone of a launcher in order to simultaneously support there a relatively large number of small satellites.

In the case of heavy and relatively large satellites, none of the known means make it possible to completely eliminate collision risks when the satellites separate from the launcher. Thus, such satellites are conventionally juxtaposed on a carrying structure in the form of a plate or platform and their separation from the latter takes place perpendicular thereto. The ejection of a satellite inevitably then produces collision risks with the neighbouring satellite or satellites, when the distance separating them is relatively small.

DE-A-42 43562 proposes installing very small payloads on the same launcher. In one of the embodiments described, the loads are placed on the carrying structure by means of an adaptor making it possible to incline the load before it is separated from the launcher. More specifically, the means comprises a part mounted in tilting manner on the carrying structure, a guidance part carried by the tilting part and a carrying part to which is fixed the load. The flight stresses are taken up by the guidance of the carrying part on the guidance part. Prior to launch, a tilting mechanism controls the tilting of the three parts with respect to the carrying structure. The operation of an explosive bolt, initially connecting the guidance part to the carrying part, has the effect of ejecting the load and said latter part under the action of ejection springs.

The arrangement described in DE-A-42 43562 makes it possible to avoid collision risks between small loads carried by the same launcher during the launch of said loads. However, it is completely inappropriate for the launching of heavy satellites incorporating fragile elements. Thus, the tilting control mechanism supports all the stresses and loads which are then exerted by the ejection springs. Therefore the mechanism must be dimensioned in such a way that said stresses have no effect on the orientation of the load during its ejection. In the case of a heavy load, this dimensioning will lead to the application of a considerable shock or impact to each load during tilting prior to ejection. Such a shock is unacceptable because it may damage and/or misadjust certain components of the satellite.

Moreover, the means described in DE-A-42 43562 makes it necessary to eject a carrying part with the satellite. This increases the weight of the latter and therefore accentuates the previous disadvantage. In general terms, such a weight increase is highly prejudicial, particularly as it occurs on each of the satellites carried by the launcher.

DESCRIPTION OF THE INVENTION

The invention relates to an adaptor for interposing between the carrying structure placed beneath the nose cone of a launcher and each of the payloads, so as to permit, for a small size and without damaging or misadjusting the vehicle-borne systems and without any risk of collision during separation, the simultaneous carriage of at least two juxtaposed, relatively large and heavy payloads.

According to the invention, this result is obtained by means of a payload adaptor to be installed on a carrying structure for the simultaneous carriage on the same launcher of at least two juxtaposed payloads, said adaptor comprising:

- a support part which can be fixed to the carrying structure, the support part having a lug,
- a tilting part connected to the support part or to the carrying structure by articulation means, the tilting part having a lug,
- first, remotely unlockable holding means interposed between the support part and the tilting part for normally maintaining the tilting part in a payload carriage position, so as to overlap the lugs,
- tilting control means, interposed between the tilting part and the support part or the carrying structure, in order to automatically bring the tilting part into a payload separation position by pivoting around articulation means during an unlocking of the holding means,
- end of travel locking means, associated with the tilting control means and automatically actuated when the tilting part arrives in the payload separation position and
- second, remotely unlockable holding means, which can be directly interposed between the tilting part and the payload in order to normally maintain the latter on the tilting part.

Each of the payloads is placed on the carrying structure, which is generally in the form of a circular support plate, by means of a separate adaptor. Throughout the launch phase, the adaptors remain in their carriage position enabling the payloads juxtaposed beneath the launcher nose cone to occupy a minimum volume. When it is wished to effect the separation of one or more payloads following the ejection of the nose cone, the holding means of the adaptor corresponding thereto are unlocked, so that the tilt control means automatically bring the tilting part into its launch position, where it is secured by the end of travel locking means. In this position, the payload placed on the adaptor is inclined, e.g. by an angle of approximately 15°, away from the neighbouring payload. Consequently, when the separation of the payload is commanded, it takes place without any collision risk. Moreover, in view of the fact that the stresses exerted during the ejection are entirely supported by the end of travel locking means, it is possible to dimension the tilt control means so as to avoid any shock or impact being applied to the load. At the end of travel a shock absorption means can also be provided.

It should be noted that the adaptors by which each of the payloads is placed on the carrying structure can be simultaneously or separately controlled, in order to ensure the simultaneous or separate tilting of the corresponding payloads prior to their separation.

In a preferred embodiment of the invention, the first holding means incorporate at least one first pyrotechnic disconnection strap and the second holding means incorporate at least one second pyrotechnic disconnection strap.

Advantageously, the support part and the tilting part are kept in contact by the first strap, along a substantially planar and circular junction surface, when the tilting part occupies its payload carriage position. In this case, articulation means define a pivoting axis located substantially in the plane of the junction surface, outside said surface and oriented substantially parallel to a tangent to said surface. Moreover, the payload and tilting part can be kept in direct contact by the second strap, according to a substantially planar and circular junction surface.

To eliminate any collision risk between the payloads during their separation, the pivoting axis of a given adaptor is positioned opposite to at least one payload placed on the carrying structure with respect to the junction surface.

In the preferred embodiment of the invention, the tilt control means comprise at least one spring actuator, whose ends are respectively articulated to the tilting part and to the support part or carrying structure, and the end of travel locking means are associated with said actuator.

Preferably, the tilting part supports ejection means, such as spring ejectors, which act directly on the payload.

BRIEF DESCRIPTION OF THE DRAWINGS

A preferred embodiment of the invention will be described in greater detail hereinafter in an illustrative and non-limitative manner with reference to the attached drawings, wherein show:

FIG. 5 is a schematic view and is not relied upon for specific structural features.

DETAILED DESCRIPTION OF AN EMBODIMENT

Figure 1:
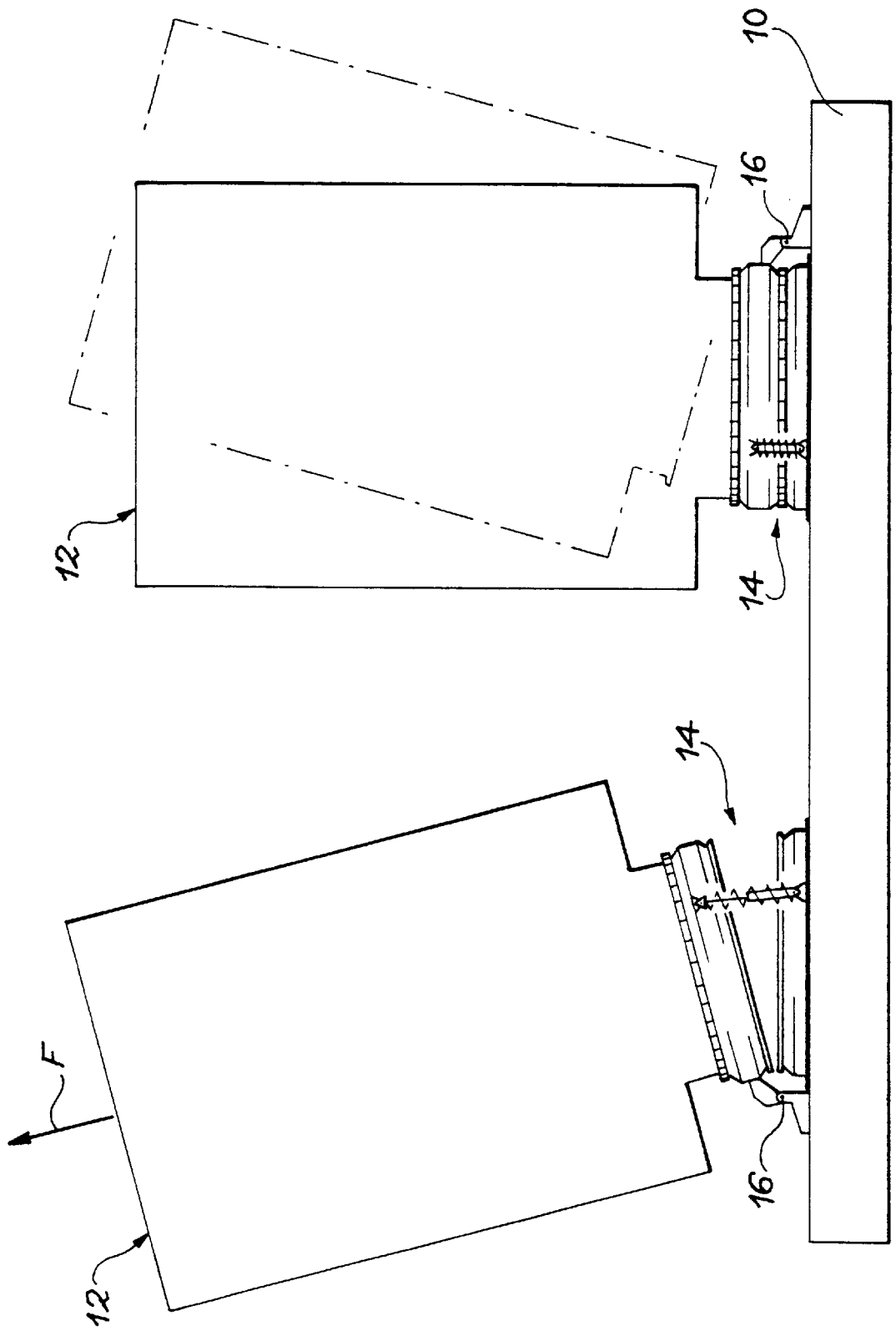
FIG. 1 A side view very diagrammatically showing the installation of two satellites on a launcher support plate, by means of two adaptors according to the invention, the adaptor illustrated to the right of the drawing occupying its carriage position, whereas the adaptor illustrated to the left thereof occupies its launch position.

In FIG. 1 reference 10 designates a circular support plate constituting a carrying structure placed at the top of a not shown launcher, in the not shown nose cone forming the upper envelope of the launcher. The circular support plate 10 is a conventional carrying structure used on several existing launchers and it does not form part of the present invention.

The invention relates to the case where the circular support plate 10 simultaneously supports at least two payloads such as two heavy satellites 12 juxtaposed beneath the launcher nose cone.

According to existing technologies, the satellites 12 would be directly installed on the support plate 10 by remotely unlockable holding means. When the unlocking is commanded, ejection means such as spring ejectors would propel the satellites 12 away from the support plate 10 in a direction substantially perpendicular to the plane of the latter. Bearing in mind the proximity of the satellites 12 imposed by their volume, there would be a significant collision risk.

According to the invention, this risk is eliminated by interposing a small adaptor 14 between each of the satellites 12 and the circular support plate 10.

As illustrated to the right of FIG. 1, the adaptors 14 are normally kept in a satellite carriage position, where the satellite occupies a position identical to that which it would occupy in the absence of an adaptor, i.e. if the satellite were directly placed on the support plate. The adaptor 14 is maintained in this carriage position throughout the launch phase until the launcher arrives in the orbit injection position for the corresponding satellite.

When the launcher arrives in the latter position, the corresponding adaptor 14 is brought into its satellite separation position, diagrammatically illustrated in the left-hand part of FIG. 1. In this separation position, the direction in which the satellite 12 is ejected forms with the perpendicular to the plane defined by the circular support plate 10 an angle of approximately 15°. This ejection direction is illustrated by the arrow F in FIG. 1.

This inclination of the ejection direction F is obtained by a pivoting of the satellite 12 by the aforementioned angle controlled by the adaptor 14, about a pivoting axis 16. To this end, the pivoting axis 16 is oriented parallel to the plane defined by the circular support plate 10. Moreover, the pivoting axis 16 is located on each adaptor 14 on the side opposite to the neighbouring satellite 12, so that the tilting of the satellite controlled by the adaptor has the effect of inclining the ejection direction F away from the neighbouring satellite, as is diagrammatically illustrated in FIG. 1.

As a result of the characteristics described hereinbefore, the separation of any random satellite 12 takes place without any risk of a collision between said satellite and the adjacent satellite or satellites, but without any increase in the overall dimensions of the satellites beneath the nose cone at the time of launch.

A more detailed description will now be given of a preferred embodiment of the adaptor 14 according to the invention with reference to FIGS. 2 to 5.

The adaptor 14 firstly comprises a support part 18 in the form of a cylindrical ferrule, which is to be fixed to the circular support plate 10, e.g. by means of not shown bolts. The adaptor 14 also comprises a tilting part 20 in the form of a cylindrical ferrule for receiving and supporting in a direct manner the corresponding satellite 12.

The pivoting axis 16 is materialized by two tilting joints 22. These joints forming part of the adaptor 14 connect the tilting part 20 to the support plate 10. In more specific form, each of the joints 22 has a base 24, fixed e.g. by means of bolts to the support plate 10 and a bracket 26, e.g. fixed by means of bolts to the tilting part 20. The bracket 26 is connected to the base 24 by a pivot pin oriented in accordance with the pivot axis 16.

Figure 5:
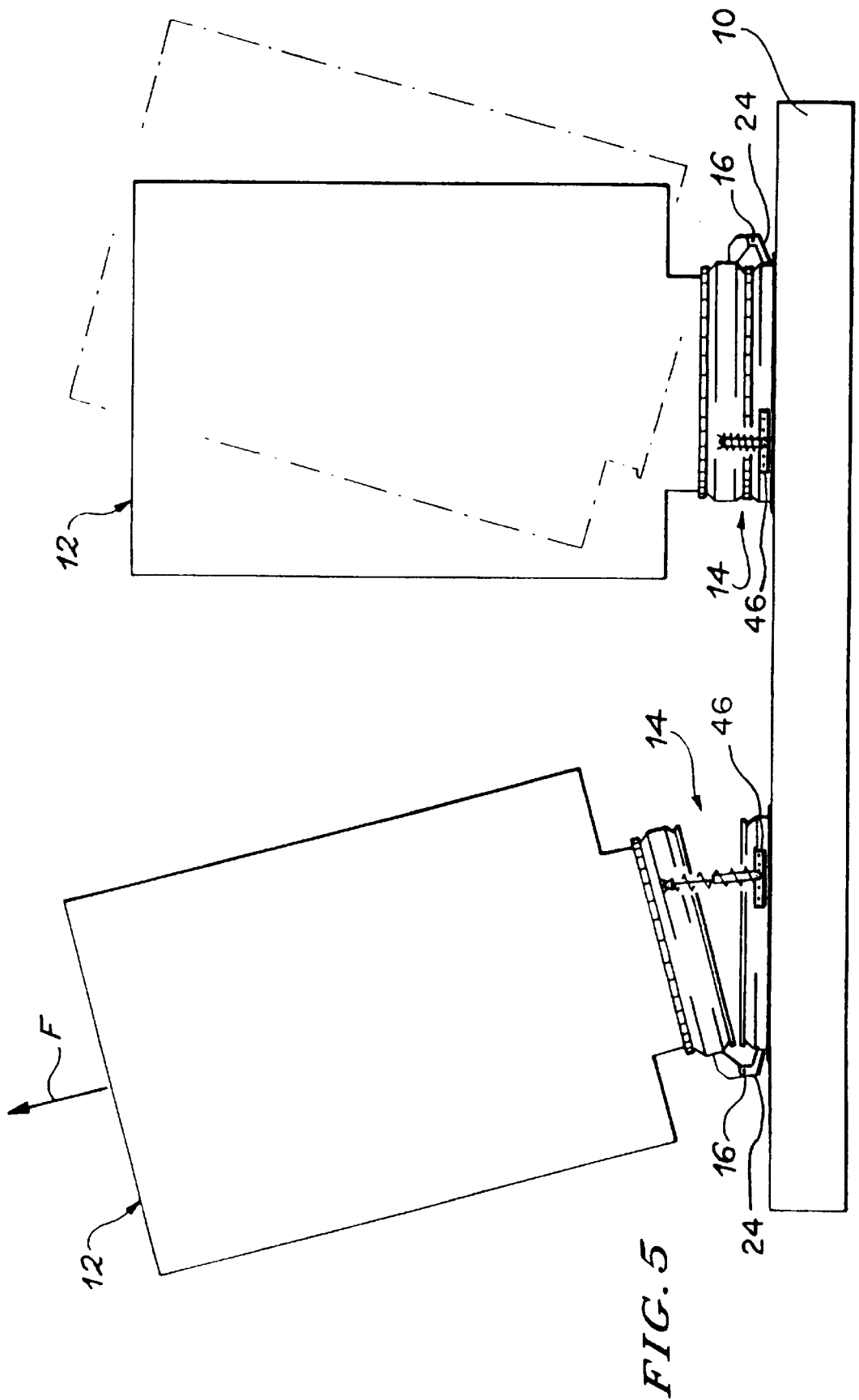
FIG. 5 An alternative view of the adaptor shown in FIG. 1 where the clevis of the tilt control means is attached to the support part and the base of the bracket is fixed to the support part.

It should be noted that, in a variant, the bases 24 can be directly fixed to the support part 18 as schematically shown in FIG. 5. In addition, the number of joints 22 can differ from two.

Figure 2:
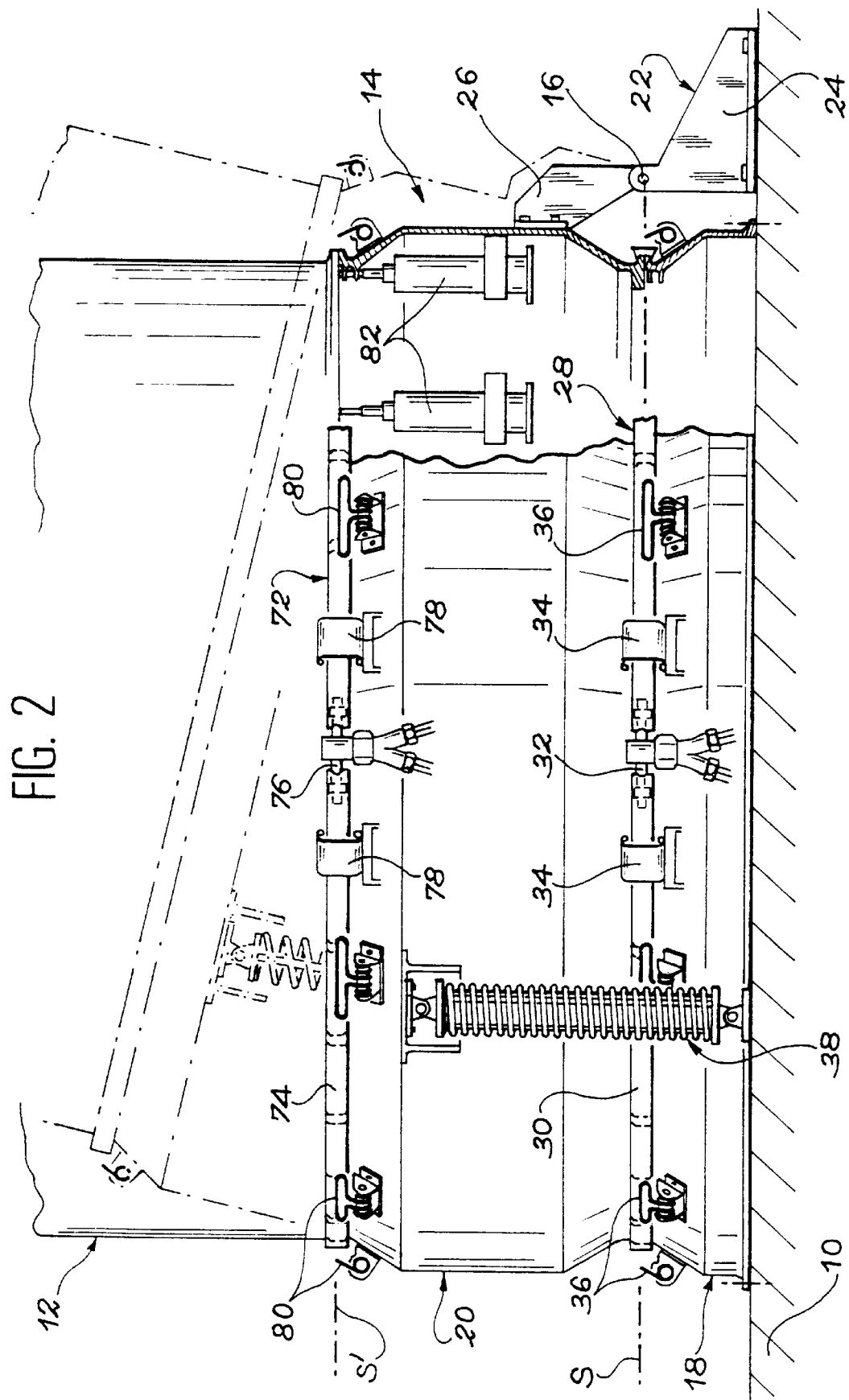
FIG. 2 A larger scale and part sectional side view of an adaptor according to the invention shown in continuous line form in its satellite carriage position.

In the satellite carriage position illustrated in FIG. 2, the support part 18 and tilting part 20, which are both in the form of cylindrical ferrules with essentially the same diameter, are arranged coaxially and in contact with one another along a substantially planar and circular junction surface, located in a plane represented by the line S in FIG. 2.

In this preferred arrangement, the pivoting axis 16 materialized by the joints 22 is located substantially in the plane S, outside the junction surface of the parts 18 and 20 and oriented in a direction substantially parallel to a tangent to said junction surface.

The adaptor 14 according to the invention also comprises first, remotely unlockable holding means 28 by means of which the tilting part 20 is normally maintained in the satellite carriage position illustrated in FIG. 2, i.e. in contact with the support part 18 along the aforementioned circular junction surface located in the plane S.

In the embodiment illustrated in FIG. 2, said holding means 28 comprise a strap 30, which passes around the contacting portions of the parts 18 and 20 over the entire circumference of said parts. The strap 30 is equipped with rigid segments, having a substantially U-shaped cross-section and which simultaneously overlap two lugs formed at adjacent ends of the parts 18 and 20, in order to engage them against one another along the said circular junction surface.

The strap 30 has at least one section 32, whose disconnection can be remotely controlled by pyrotechnic means in per se known manner. Staples 34 and spring stops 36 mounted on the support part 18 ensure that following the disconnection of the section 32 the strap 30 does not separate from the support part 18, so that there is no risk of damaging adjacent structures.

In order to bring the tilting part 20 into the separation position diagrammatically illustrated to the left in FIG. 1 and in mixed line form in FIG. 2, the adaptor 14 also has means for controlling the tilting of said part, which automatically come into action when the disconnection of the section 32 of strap 30 takes place.

In the embodiment illustrated in the drawings, these tilt control means comprise two spring actuators 38 interposed between the support plate 10 and the tilting part 20. More specifically, each of the spring actuators 38 is oriented according to an axis substantially perpendicular to the plane of the support plate 10 when the adaptor 14 occupies its satellite carriage position. As is more specifically shown in FIGS. 2 and 3, the spring actuators 38 are positioned outside the support part 18, at symmetrical locations with respect to a median plane of the adaptor oriented perpendicular to the pivoting axis 16 and relatively remote from said axis.

Figure 4:
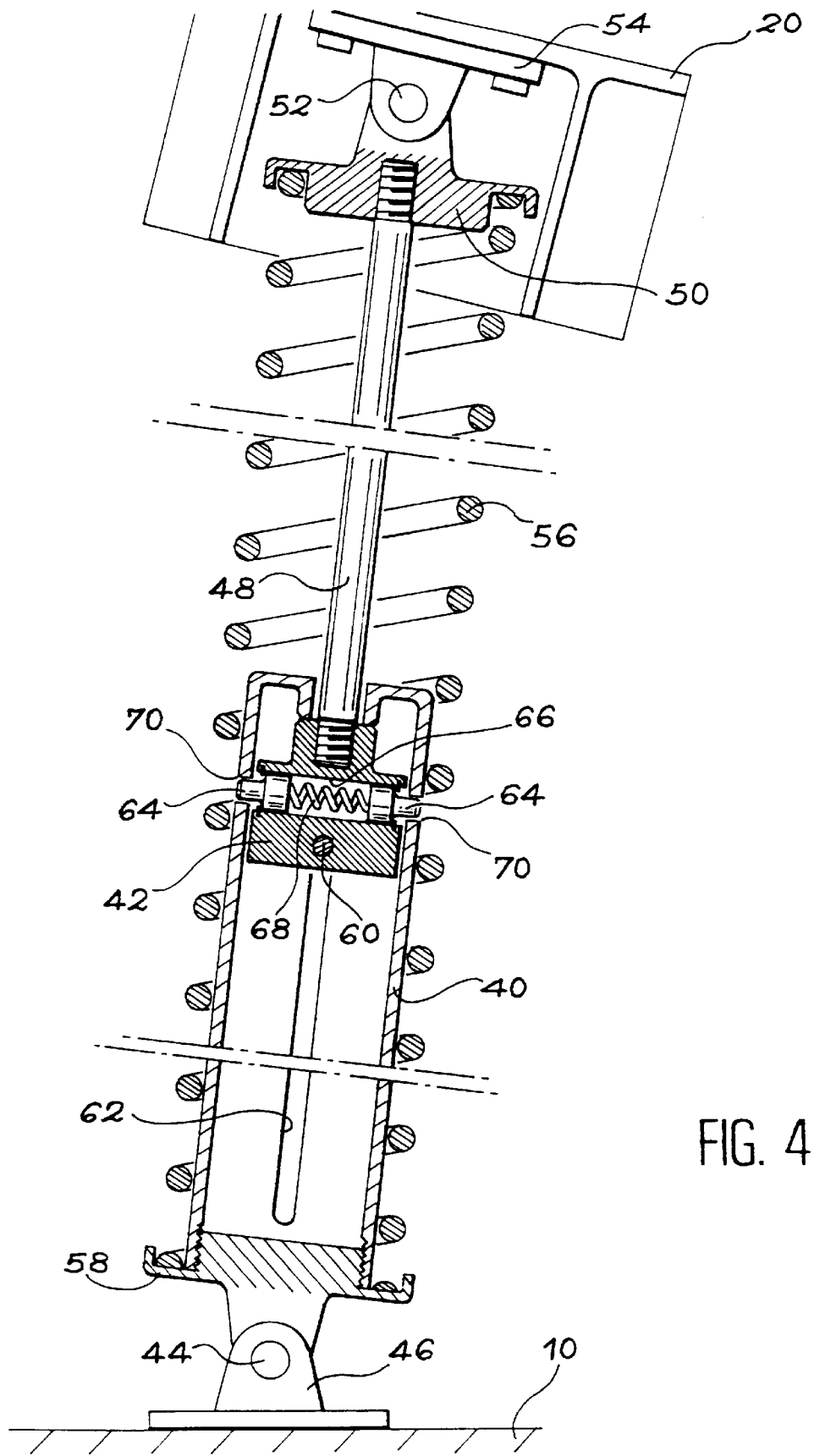
FIG. 4 A larger scale side view of one of the spring actuators used for controlling the tilting of the adaptor, said actuator being shown in its extreme extension position following operation.

As is more particularly illustrated in FIG. 4, each of the spring actuators 38 has a cylindrical tube 40 in which is slidingly received a piston-shaped part 42. A first end of the cylindrical tube 40 is articulated by a pin 44 on a clevis 46 fixed to the support plate 10, e.g. by bolts. The pin 44 is oriented parallel to the pivoting axis 16 of the adaptor.

The piston-shaped part is fixed to a first end of a rod 48 oriented in accordance with the axis of the cylindrical tube 40 on moving away from the end of said tube articulated to the pin 44. The opposite end of the rod 48 is fixed to a cup 50, articulated by a pin 52 on a clevis 54 fixed to the tilting part 20, e.g. by not shown bolts. The pin 52 is oriented parallel to the pin 44, as well as to the pivoting axis 16 of the adaptor 14.

The assembly constituted by the cylindrical tube 40 and the rod 48 is surrounded by a helical compression spring 56, whereof a first end bears on the cup 50 and whereof the opposite end bears on an annular ledge 58 surrounding the end of the cylindrical tube 40 articulated to the pin 44.

In addition, the piston-shaped part 42 has on its periphery two diametrically opposite guide pins 60, which slide in longitudinal grooves 62 formed within the cylindrical tube 40 and parallel to its axis. The assembly constituted by the pins 60 and the grooves 62 prevents any rotation of the piston-shaped part 42, when it is displaced within the cylindrical tube 40.

Each of the spring actuators 38 is also equipped with end of travel locking means, by means of which the elongated position assumed by the actuator during the release of the spring 56 accurately determines the tilt angle of e.g. approximately 15° assumed by the satellite when it occupies its separation position following the disconnection of the strap 30.

These locking means have the main function of taking up the stresses and strains applied during the separation and ejection of the satellite 12. They therefore make it possible to dimension the spring actuator 38 in such a way that the tilting movement takes place slowly and without inducing any impacts prejudicial to the equipments carried by the satellite. End of travel shock absorption means can also be associated with each of the spring actuators 38.

In the embodiment illustrated in FIG. 4, the end of travel locking means comprise two locking parts 64 fitted in opposition in a bore 66 radially traversing the piston-shaped part 42. A compression spring 68 placed between these two locking parts 64 permanently applies them to the internal surface of the cylindrical tube 40.

When the spring actuator 38 reaches its full extension position illustrated in FIG. 4, the reduced diameter, outer ends of the locking parts 64 are in front of two diametrically opposite holes 70 formed in the cylindrical tube 40. Consequently, these ends of the locking parts 64 penetrate the holes 70 under the action of the spring 68. The piston-shaped part 42 is then automatically locked in said position, which prevents any supplementary extension of the spring 56. It should be noted that the cooperation of the guide pins 60 with the guide grooves 62 prevents any relative rotation between the piston-shaped part 42 and the cylindrical tube 40. Therefore the locking parts 64 arrive automatically in front of the holes 70, when the spring 56 reaches its full extension.

Figure 3:
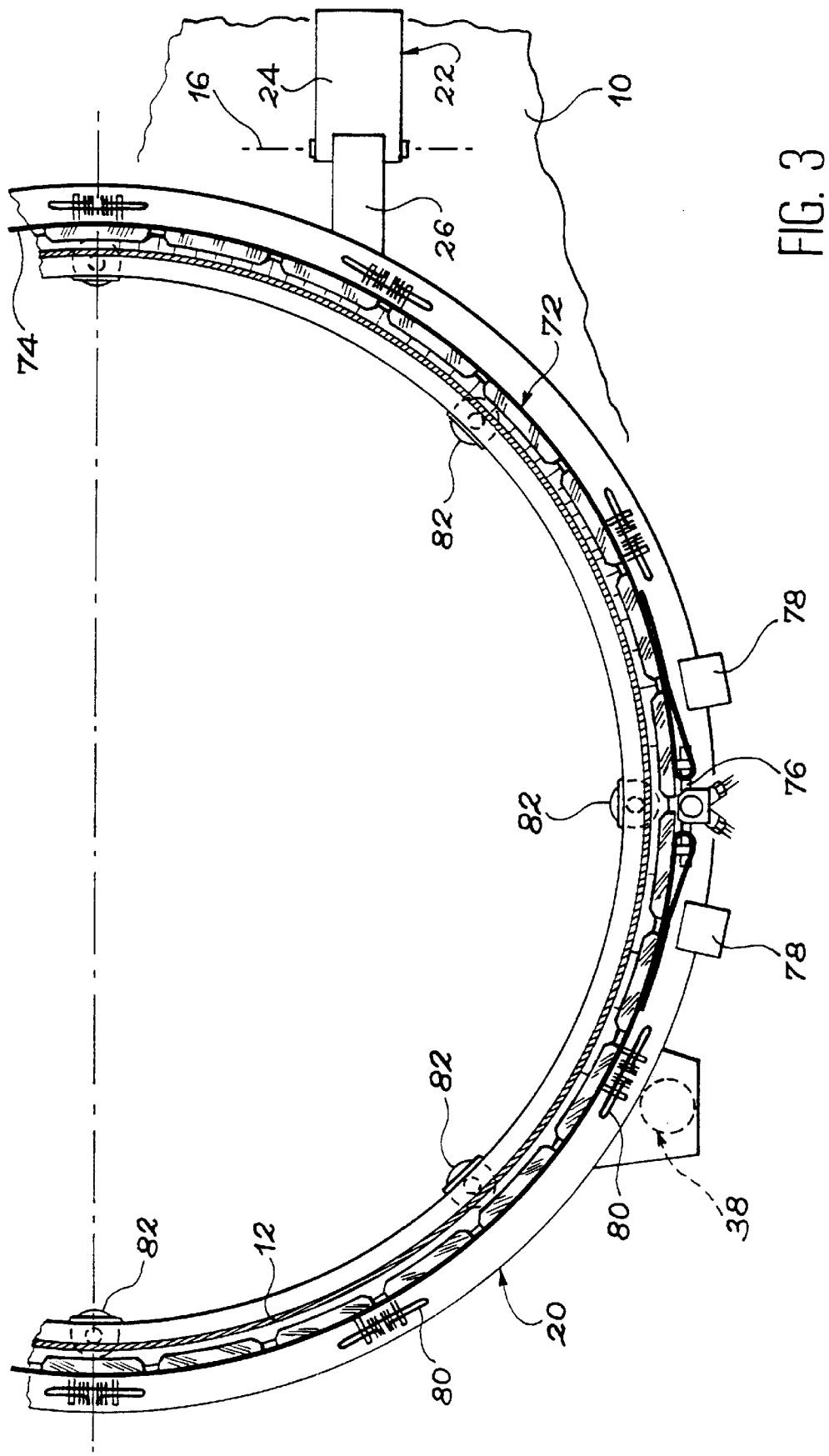
FIG. 3 A half-plan view of the adaptor of FIG. 2.

As a variant, the end of travel locking means can also incorporate spring leaves installed on the periphery of the piston-shaped part 42, so as to be able to move away from the latter in their lower part when considering FIG. 3. At the end of travel, the spring leaves are placed in an annular groove formed in the cylindrical tube 40 and then prevent any displacement of the part 42 towards the bottom of FIG. 3. The tilting part 20 has means making it possible to maintain the satellite 12 on said part and control the separation thereof when the satellite is released.

As is diagrammatically illustrated in FIGS. 2 and 3, said devices firstly comprise second, remotely unlockable holding means 72 keeping the satellite 12 and tilting part 20 directly in contact in accordance with a planar, circular junction surface S'. Prior to the tilting of the part 20, the junction surfaces S and S' are parallel to one another. The second holding means 72 are constructed in the same way as the holding means 28 by which the tilting part 20 is normally kept in contact with the support part 18 in the satellite carriage position.

Thus, the second holding means 72 comprises a strap 74, which normally encircles two lugs, so as to keep them maintained against one another and which are respectively formed on the face of the tilting part 20 opposite to the support part 18 and on the adjacent face of the satellite 12. The strap 74 is equipped with at least one pyrotechnic disconnection section 76. Staples 78 and elastic stops 80 are provided on the tilting part 20 to prevent the escape of the strap 74 with a risk of damaging neighbouring structures, when the disconnection section 76 is actuated.

The separation of the satellite 12 during the disconnection of the strap 74 is ensured by ejection means, e.g. constituted by spring ejectors 82 installed within the tilting part 20 and regularly distributed over the entire periphery thereof. As illustrated e.g. in FIG. 3, eight spring ejectors 82 can thus be provided on the tilting part 20 to ensure the separation of the satellite 12 following the disconnection of the strap 74.

The above description shows that the adaptor according to the invention permits the juxtapositioning on the same support plate located beneath the nose cone of a launcher of several relatively heavy and cumbersome payloads, in a volume which is scarcely greater than the total volume of the individual loads, without there being any collision risk when the loads are launched and this applies both when the loads are successively launched and when they are simultaneously launched. It is important to note that this result is obtained without leading to the application of unacceptable shocks to the vehicle-borne loads and without increasing the weight thereof.

It should be noted that the members such as the base 24 and the clevis 46, which are directly fixed to the carrying structure 10 in the embodiment described, can also be fixed to the support part 18 without passing outside the scope of the invention.

We claim:

1. Payload adaptor to be installed on a carrying structure for the simultaneous carriage on the same launcher of at least two juxtaposed payloads, said adaptor comprising:

a support part which can be fixed to the carrying structure, the support part having a first lug;

a tilting part connected to the support part or to the carrying structure by articulation means, the tilting part having a second lug;

first, remotely unlockable holding means interposed between the support part and the tilting part so as to overlap the first and second lugs for normally maintaining the tilting part in a payload carriage position;

tilting control means, interposed between the tilting part and the support part or the carrying structure, in order to automatically bring the tilting part into a payload separation position by pivoting around articulation means during an unlocking of the first holding means;

end of travel locking means, associated with the tilting control means and automatically actuated when the tilting part arrives in the payload separation position; and second, remotely unlockable holding means, which can be directly interposed between the tilting part and the payload in order to normally maintain the latter on the tilting part.

2. Adaptor according to claim 1, wherein the tilting part supports ejection means able to act directly on the payload.

3. Payload adaptor to be installed on a carrying structure for the simultaneous carriage on the same launcher of at least two juxtaposed payloads, said adaptor comprising:

a support part which can be fixed to the carrying structure;

a tilting part connected to the support part or to the carrying structure by articulation means;

first, remotely unlockable holding means interposed between the support part and the tilting part for normally maintaining the tilting part in a payload carriage position;

tilting control means, interposed between the tilting part and the support part or the carrying structure, in order to automatically bring the tilting part into a payload separation position by pivoting around articulation means during an unlocking of the first holding means;

end of travel locking means, associated with the tilting control means and automatically actuated when the tilting part arrives in the payload separation position; and second, remotely unlockable holding means, which can be directly interposed between the tilting part and the payload in order to normally maintain the latter on the tilting part, and wherein the first holding means comprise at least one pyrotechnic disconnection strap and wherein the second holding means comprise at least one second pyrotechnic disconnection strap.

4. Adaptor according to claim 3, wherein the support part and tilting part are kept in contact by the first strap, along a substantially planar and circular junction surface, when the tilting part occupies its payload carriage position.

5. Adaptor according to claim 4, wherein the articulation means define a pivoting axis located substantially in the plane of the junction surface, outside said surface and oriented substantially parallel to a tangent to said surface.

6. Adaptor according to claim 3, wherein the payload and the tilting part can be kept in direct contact by the second strap, along a substantially planar and circular junction surface.

7. Payload adaptor to be installed on a carrying structure for the simultaneous carriage on the same launcher of at least two juxtaposed payloads, said adaptor comprising:

a support part which can be fixed to the carrying structure;

a tilting part connected to the support part or to the carrying structure by articulation means;

first, remotely unlockable holding means interposed between the support part and the tilting part for normally maintaining the tilting part in a payload carriage position;

tilting control means, interposed between the tilting part and the support part or the carrying structure, in order to automatically bring the tilting part into a payload separation position by pivoting around articulation means during an unlocking of the first holding means;

end of travel locking means, associated with the tilting control means and automatically actuated when the tilting part arrives in the payload separation position; and second, remotely unlockable holding means, which can be directly interposed between the tilting part and the payload in order to normally maintain the latter on the tilting part, and wherein the tilt control means comprise at least one spring actuator, whose ends are respectively articulated to the tilting part and to the support part or the carrying structure, the end of travel locking means being associated with said actuator.

* * * * *